US006115463A

United States Patent [19]

Coulombe et al.

[11] Patent Number: 6,115,463

[45] Date of Patent: Sep. 5, 2000

[54] MIGRATION OF SUBSCRIBER DATA BETWEEN HOME LOCATION REGISTERS OF A TELECOMMUNICATIONS SYSTEM

[75] Inventors: Marc Coulombe, Montreal; Jacques Bugnon, Repentigny; Benoit Coulombe; Roch Glitho, both of Montreal; David Sugirtharaj, Laval, all of Canada

[73] Assignee: Telefonaktiebolaget LM Ericsson (publ), Stockholm, Sweden

[21] Appl. No.: 08/975,632

[22] Filed: Nov. 21, 1997

[51] Int. Cl.$^{7}$ .......... H04B 1/00

[52] U.S. Cl. .......... 379/230; 379/219; 379/220; 379/229

[58] Field of Search .......... 279/229, 230, 279/219, 220; 455/433, 432, 560

[56] References Cited

U.S. PATENT DOCUMENTS

| | | | |
|---|---|---|---|
| 5,054,019 | 10/1991 | Mathis et al. . | |
| 5,561,854 | 10/1996 | Antic et al. . | |
| 5,572,579 | 11/1996 | Orriss et al. | 379/230 |
| 5,664,005 | 9/1997 | Emery et al. . | |
| 5,732,127 | 3/1998 | Hayes | 379/229 |
| 5,758,281 | 5/1998 | Emery et al. | 379/229 |
| 5,771,275 | 6/1998 | Brunner et al. | 379/230 |
| 5,819,178 | 10/1998 | Cropper | 455/433 |
| 5,878,347 | 3/1999 | Joensuu et al. | 455/433 |
| 5,878,348 | 3/1999 | Foti | 455/433 |
| 5,890,062 | 3/1999 | Courtney et al. | 455/433 |
| 5,901,353 | 5/1999 | Pentikainen | 455/433 |
| 5,905,954 | 5/1999 | Nguyen | 455/433 |
| 5,915,218 | 6/1999 | Talagery et al. | 455/433 |

FOREIGN PATENT DOCUMENTS

| | | |
|---|---|---|
| 2154089 | 1/1996 | Canada . |
| 0 738 095 | 4/1996 | European Pat. Off. . |
| 94/23506 | 10/1994 | WIPO . |
| WO 96/21981 | 12/1995 | WIPO . |
| WO 97/15162 | 10/1996 | WIPO . |
| 97/09676 | 3/1997 | WIPO . |
| 97/12469 | 4/1997 | WIPO . |

OTHER PUBLICATIONS

PCT International Search Report, Feb. 17, 1999, PCT/SE 98/01965.

*Primary Examiner*—Harry S. Hong
*Assistant Examiner*—William J. Deane, Jr.
*Attorney, Agent, or Firm*—Jenkens & Gilchrist

[57] ABSTRACT

A common channel signaling system interconnects two home location registers. A data administrator responds to a network operator request by sending commands to a first (originating) home location register to have subscriber data extracted and formatted for communication over the common channel signaling system. Prior to communication, the first home location register verifies a common channel signaling system functionality level of a second (destination) home location register. If verified, the communication is sent, unformatted, and the included subscriber data stored. A data network and service management access layer further interconnect the two home location registers. The data administrator responds to a generic network operator migration request by generating home location register specific commands instructing the first home location register to extract subscriber data for transfer over the data network and through the service management access layer to the second home location register for storage. Transfer considerations are also evaluated to select either the common channel signaling system or data network for the migration.

16 Claims, 3 Drawing Sheets

MIGRATION OF SUBSCRIBER DATA BETWEEN HOME LOCATION REGISTERS OF A TELECOMMUNICATIONS SYSTEM

BACKGROUND OF THE INVENTION

1. Technical Field of the Invention

The present invention relates to telecommunications systems and, in particular, to the migration of subscriber data between home location registers (HLRs) of a telecommunications system.

2. Description of Related Art

Reference is now made to FIG. 1 wherein there is shown a block diagram of a portion of a telecommunications network 10 implementing a prior art subscriber data migration scheme. The network 10 comprises a public land mobile network (PLMN) 12 (also ref erred to as mobile communications network or cellular communications network) interconnected 14 with a public switched telephone network (PSTN) 16. Operation of the network 10, and in particular its constituent networks 12 and 16, to provide telecommunications services to subscribers (not shown) is well known to those skilled in the art, and will not be described herein.

The public land mobile network 12 includes plural home location registers 18 which individually operate as a database for storing subscriber data. This subscriber data includes permanently maintained subscriber profile information such as: the subscriber number (SNB), the mobile subscriber number (MSNB), the electronic serial number (ESN) of the subscriber's mobile telephone, subscription service features (like call waiting, call transfer) and associated data, and authentication data. The subscriber data further includes temporarily maintained information like current subscriber location.

Instances arise where it becomes necessary to migrate subscriber data among and between two home location registers 18. For example, redundant back-up of subscriber data to another home location register may be implemented, a new replacement/additional home location register may be installed in the network, or load balancing may need to be implemented between existing home location registers. The prior art migration scheme is illustrated in FIG. 1 occurring between two home location registers 18 within the public land mobile network 12. In accordance with this prior art migration scheme, the subscriber data 20 at issue is first manually output 22 from a first home location register 18(1). This output may, for example, be made to hard copy. The output subscriber data 20 is then manually input 24 into the second home location register 18(2). Typically, the manual input is made from the output hard copy. This prior art scheme involves the expenditure of a tremendous amount of effort, and is further prone to error. Additionally, the migration scheme takes a long time to complete, and before completed the subscriber data at issue may become obsolete.

There is a need for a more accurate and efficient, and perhaps automated, scheme for migration of subscriber data among and between two home location registers.

SUMMARY OF THE INVENTION

In a first embodiment of the present invention, subscriber data migration among and between two home location registers (HLRs) is performed/executed by way of a transfer over a common channel signaling system interconnecting those two home location registers. A data administrator connected to the home location registers at issue sends commands to extract the subscriber data from the database of a first (originating) home location register and format the subscriber data for communication over the common channel signaling system to a second (destination) home location register. Before proceeding with the extraction and formatting, the first home location register contacts the second home location register to verify its common channel signaling functionality level. If verified, extraction and formatting is completed, and the subscriber data is communicated over the common channel signaling system where the second home location register receives and unformats the subscriber data for storage in its database. If not verified, the process for transferring the subscriber data over the common channel signaling system is aborted.

In a second embodiment of the present invention, subscriber data migration among and between two home location registers is performed/executed by way of a transfer over a data network and through a service management access layer. A data administrator connected to the service management access layer sends a generic command requesting the subscriber data migration. The service management access layer interprets the generic command to generate home location register specific commands instructing a first (originating) home location register to extract subscriber data from its database for transfer (i.e., fetching) to the service management access layer. The service management access layer further interprets the generic command to identify delivery of the extracted subscriber data to a second (destination) home location register database. Lastly, home location register specific commands are generated by the service management access layer instructing the downloading of the subscriber data to the second home location register for storage.

In a third embodiment of the present invention, the first and second embodiments are implemented in a complementary fashion. The data administrator responds to a network operator request for the migration of subscriber data between two home location registers by evaluating transfer considerations to select subscriber data migration by way of either the common channel signaling system or the data network. Furthermore, in instances where selection is made of the common channel signaling system for the transfer, but the connection cannot be verified, the data network option is then selected.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
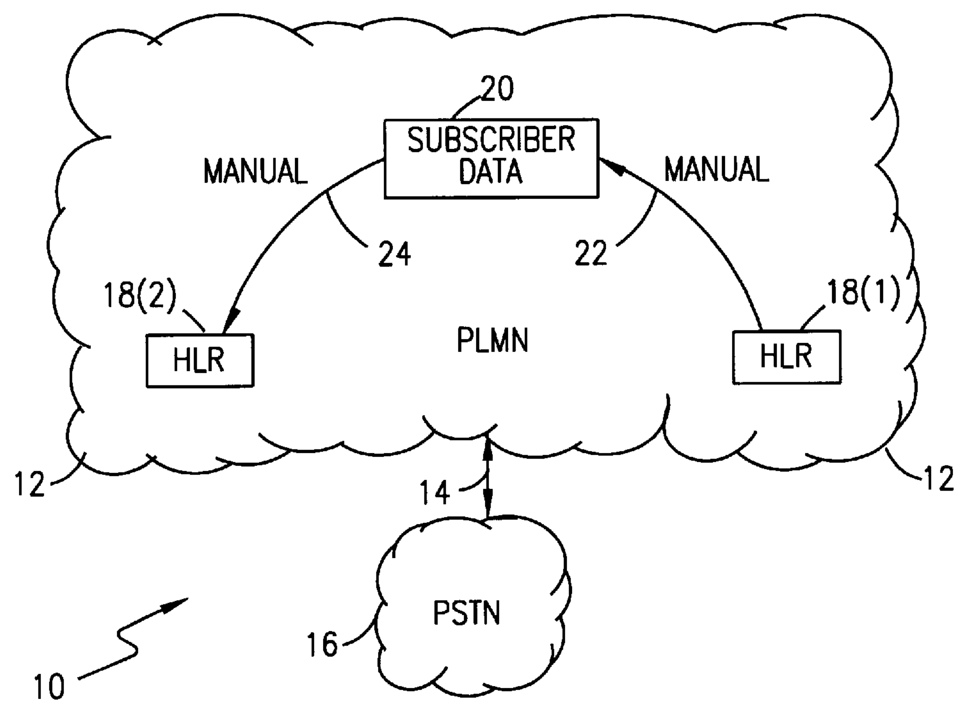
FIG. 1, previously described, is a block diagram of a portion of a telecommunications network implementing a prior art subscriber data migration scheme.
Figure 2:
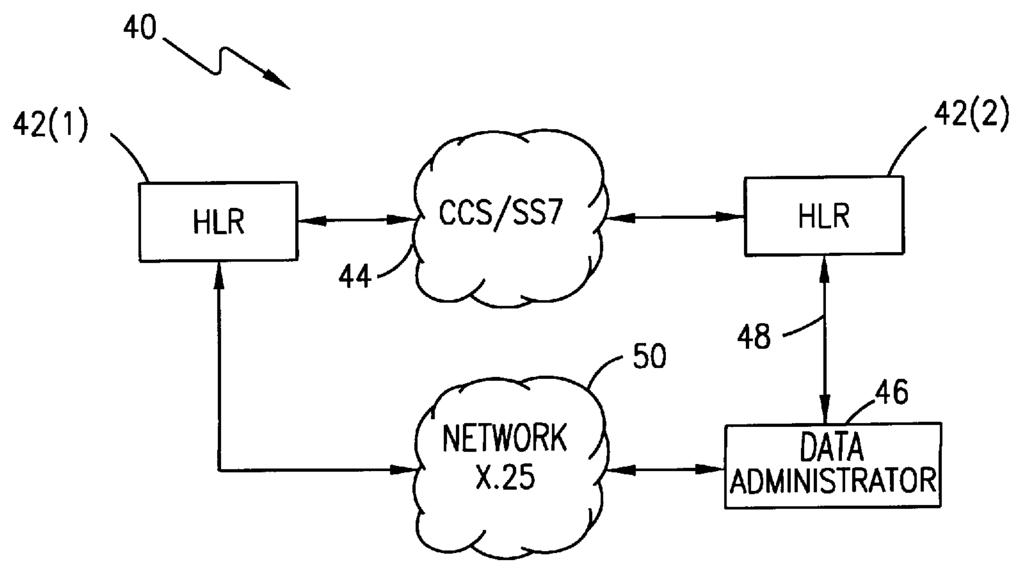
FIG. 2 is a block diagram of a portion of a telecommunications network implementing a first embodiment of a present invention subscriber data migration scheme.

Reference is now made to FIG. 2 wherein there is shown a block diagram of a telecommunications network 40 implementing a first embodiment of a present invention subscriber data migration scheme. The network 40 includes, among other non-illustrated nodes, a plurality (two illustrated) of home location registers (HLRs) 42. The home location registers 42 store subscriber data. This subscriber data includes permanently maintained subscriber profile information such as: the subscriber number (SNB), the mobile subscriber number (MSNB), the electronic serial number (ESN) of the subscriber's mobile telephone, subscription service features (like call waiting, call transfer) and associated data, and authentication data. The subscriber data further includes temporarily maintained information like current subscriber location.

The home location registers 42 are interconnected by a common channel signaling (CCS) system 44, such as that commonly provided by the Signaling System No. 7 (SS7) network part of the telecommunications network 40. A data administrator 46 is connected to the home location registers 42. This connection may be made directly, as illustrated generally at 48. Preferably, the connection is instead made through a network connection, as illustrated generally at 50. This network 50 connection may be made through the use of a network, like an X.25 network, that is separate from the telecommunications network 40.

Figure 3:
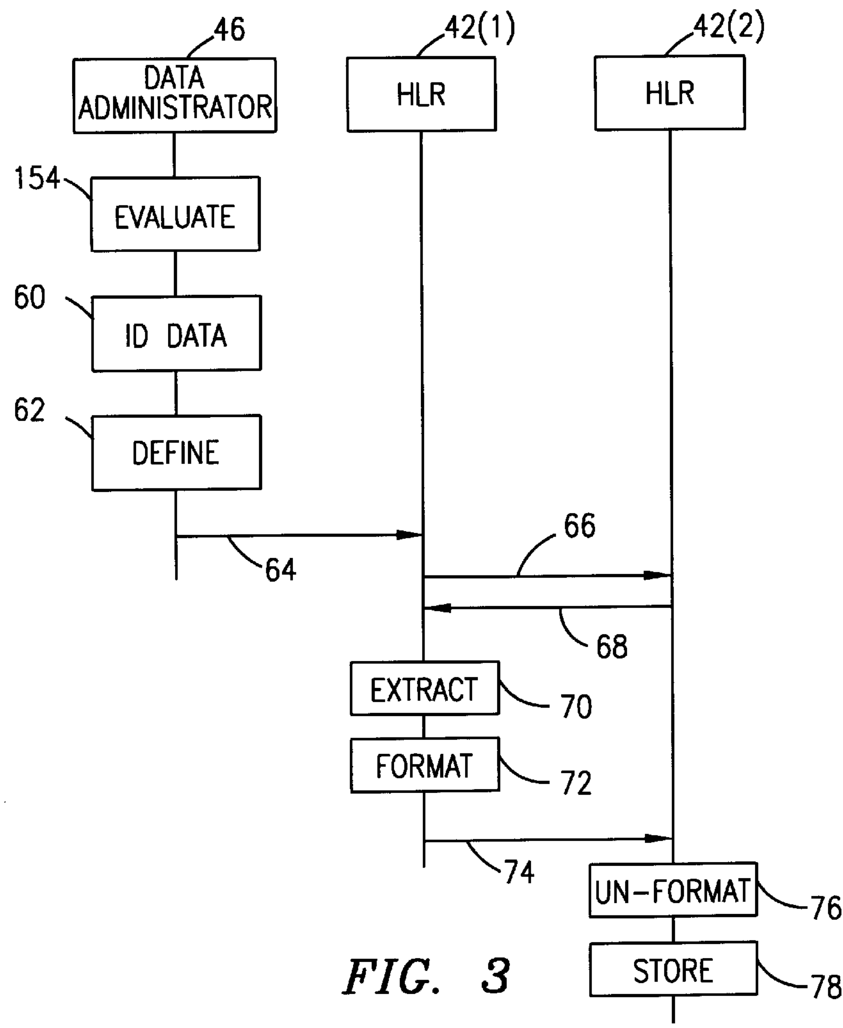
FIG. 3 is a signal flow and nodal operation diagram illustrating operation of the first embodiment subscriber data migration scheme in connection with the network of FIG. 2.

Reference is now made to FIG. 3 wherein there is shown a signal flow and nodal operation diagram illustrating operation of the first embodiment subscriber data migration scheme in connection with the network of FIG. 2. Using functionality provided by the data administrator 46, an operator of the network 40 may enter a generic command which is interpreted to specify for a given origin node (such as home location register 42(1)) which subscriber data (for example, profile(s)) are to be migrated (action 60), define where (i.e., to which destination node such as home location register 42(2)) the subscriber data are to be migrated (action 62). By "generic" it is meant a command that is independent of any one particular home location register 42. The data administrator 46 functions, at the very least, as a user interface with the network operator to receive operator commands with respect to the migration. The data administrator 46 then orders the data migration to occur by sending signal 64 to the origin home location register 42(1). Responsive to receipt of the data migration order signal 64, the receiving home location register 42(1) contacts the second home location register using signal 66 to verify its common channel signaling functionality level. If verified by a response signal 68, the home location register 42(1) extracts the subscriber data from its database (action 70) and formats the data (action 72) for communication over the common channel signaling system 44 (e.g., Signaling System No. 7 network, see FIG. 2). The formatting operation implemented would include, as needed, operations for subscriber data segmenting, conversion, and addressing functions. The properly formatted subscriber data is then communicated 74 over the common channel signaling system 44 from the first home location register 42(1) towards the second home location register 42(2). This communication 74 transmission may be governed by appropriate, industry agreed to, Interim Standard IS-41 messaging, or through the use of vendor agreed to proprietary messaging, or through the use of vendor specific private extensions of IS-41 messaging. Furthermore, it is preferred that a standardized formatting for the subscriber data communication 74 be implemented to allow vendor independent transmissions. Otherwise, the formatting must be vendor agreed to or vendor specific. At the destination second home location register 42(2), the received formatted communication 74 is unformatted (action 76), and the included subscriber data is stored (action 78) in the database. In the event verification (signals 66 and 68) cannot be accomplished, the Reference is now made to FIG. 4 wherein there is shown a block diagram of a portion of a telecommunications network 90 implementing a second embodiment of a present invention subscriber data migration scheme. The network 90 includes, among other non-illustrated nodes, a plurality (two illustrated) of home location registers (HLRs) 92. The home location registers 92 store subscriber data. This subscriber data includes permanently maintained subscriber profile information such as: the subscriber number (SNB), the mobile subscriber number (MSNB), the electronic serial number (ESN) of the subscriber's mobile telephone, subscription service features (like call waiting, call transfer) and associated data, and authentication data. The subscriber data further includes temporarily maintained information like current subscriber location.

The home location registers 92 are connected to a service management access layer (SMAL) 94 (also referred to as a service order gateway). Also connected to the service management access layer 94 is a data administrator 96. The data administrator 96 functions, at the very least, as a user interface with the network operator for the entry of commands relating to data migration. Preferably, the connection among and between the home location registers 92, service management access layer 94, and data administrator 96 is made through a network connection, as illustrated generally at 98. This network 98 connection preferably comprises a network, like an X.25 network, that is separate from the telecommunications network 90. The service management access layer 94 includes data migration logic 100 which is responsive to commands received from the data administrator 96 for causing the extraction of subscriber data stored in one node (such as the home location register 92(1)) for communication to and storage in another node (such as the home location register 92(2)).

Figure 4:
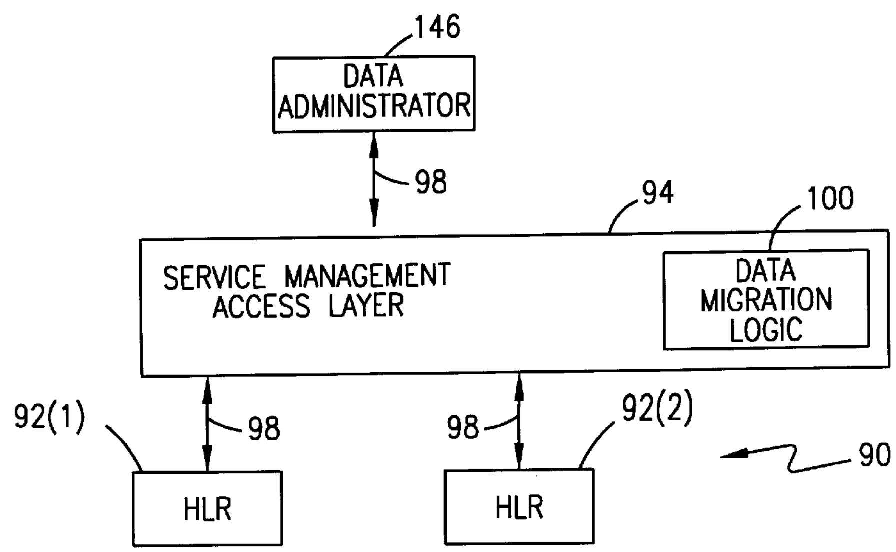
FIG. 4 is a block diagram of a portion of a telecommunications network implementing a second embodiment of a present invention subscriber data migration scheme.
Figure 5:
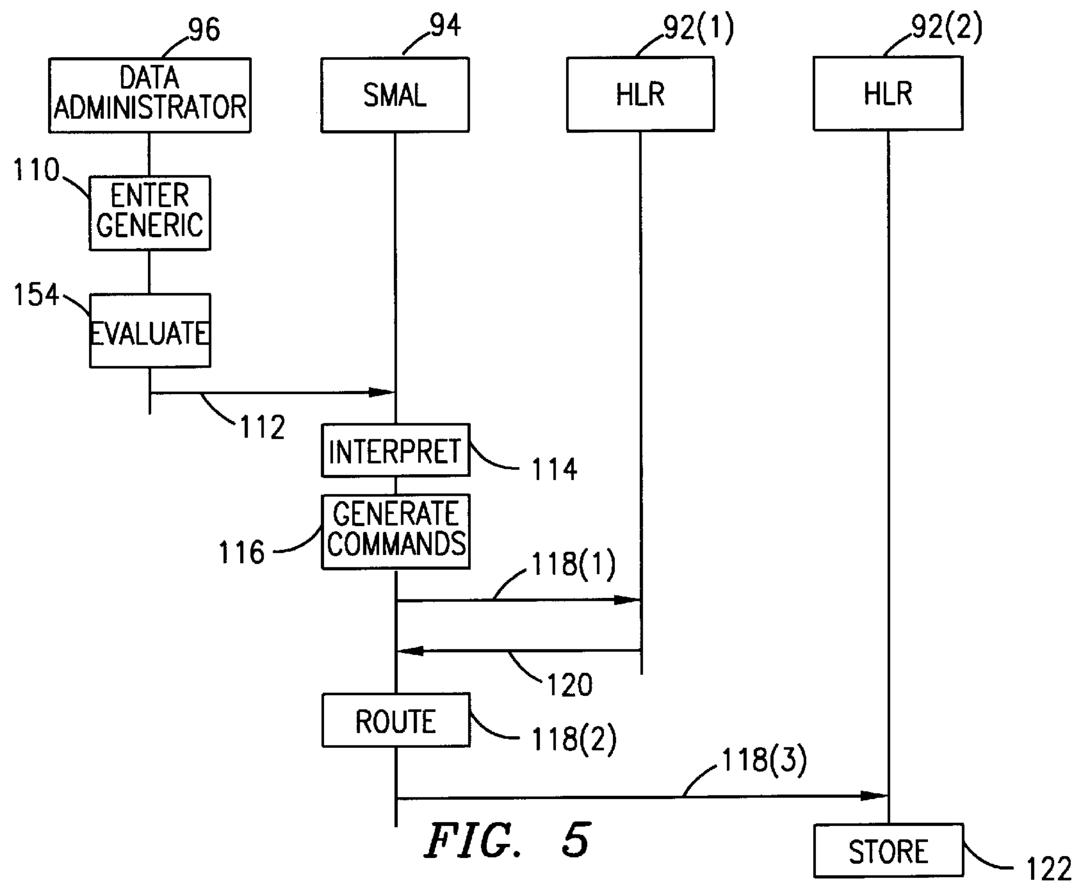
FIG. 5 is a signal flow and nodal operation diagram illustrating operation of the second embodiment subscriber data migration scheme in connection with the network of FIG. 4.

Reference is now made to FIG. 5 wherein there is shown a signal flow and nodal operation diagram illustrating operation of the second embodiment subscriber data migration scheme in connection with the network of FIG. 4. Through the data administrator 96, a network operator enters (action 110) a generic command specifying the migration of stored subscriber data from one node (such as the home location register 92(1)) to another node (such as the home location register 92(2)). By "generic" it is meant a command that is independent of any one particular home location register 92. This command includes information specifying an identification of the subscriber data to be migrated, the types of subscriber data (e.g., permanent or temporary or both) to be migrated and a schedule for migration. A signal 112 indicative of the entered command is generated by the data administrator 96, and carried over the network 98 connection to the service management access layer 94. The data migration logic 100 of the service management access layer 94 responds to the received signal 112 by interpreting (action 114) the included generic command to develop a schedule for the migration, and further to generate (action 116) appropriate node specific commands 118 to be sent to the nodes (such as the home locations registers 92) at issue in accordance with the developed schedule. By "node specific" it is meant that the generated commands 118 may be vendor (or model) specific commands understood by certain home location registers 92. Such node specific commands are needed for those situations where the network utilizes home location registers supplied by different vendors or of different models. For example, appropriate commands 118 are generated to request (118(1)) the subscriber data to be extracted (120) from one node (such as the home location register 92(1)), route (118(2)) the extracted data through the service management access layer 94, and deliver (118(3)) the routed subscriber data to another node (such as the home location register 92(2)) for storage (action 120). More particularly, the generic format and protocol of the signal 112 may be translated to man-machine-language (MML) commands compatible with each of the home location registers 92 implicated in the data migration. Alternatively, a translation of the signal 112 may be made via a machine-machine-interface (MMI) (such as standard query language—SQL) which is unique to one or more of the identified home location registers 92. Other translations and conversions may be implemented in accordance with these teachings by persons of ordinary skill in the art. The operation of the service management access layer 94 essentially involves the fetching of subscriber data from one node (such as the home location register 92(1)) and the downloading of that subscriber data to another node (such as the home location register 92(2)) for storage.

Figure 6:
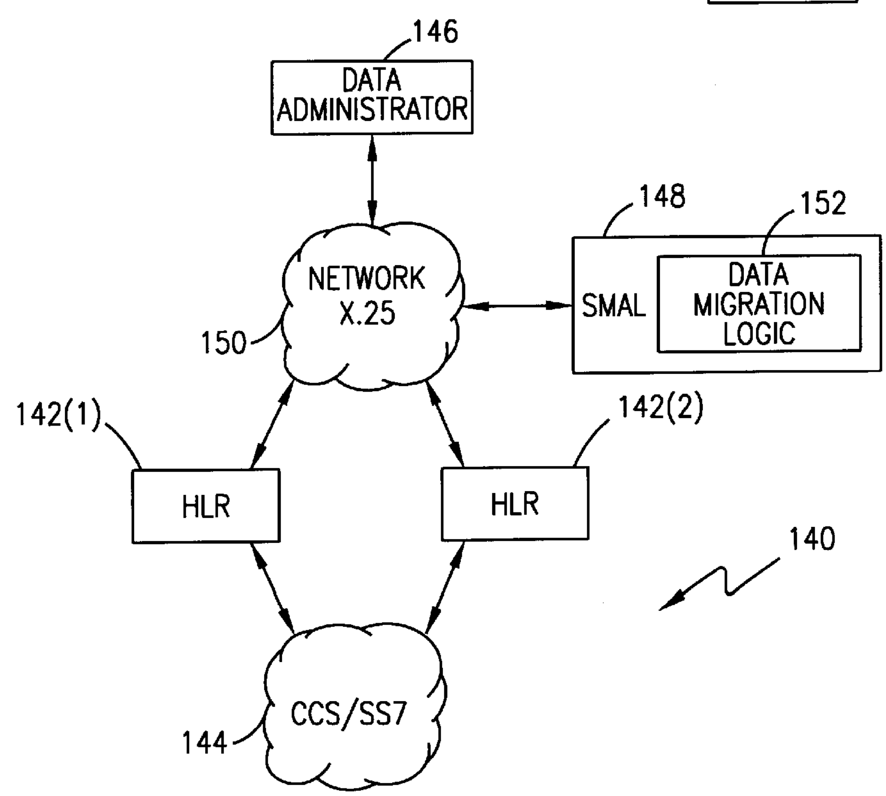
FIG. 6 is a block diagram of a portion of a telecommunications network implementing in a complementary fashion the first embodiment of FIG. 2 subscriber data migration scheme with the second embodiment of FIG. 4 subscriber data migration scheme.

FIG. 6 is a block diagram of a portion of a telecommunications network 140 implementing in a complementary fashion the first embodiment of FIG. 2 subscriber data migration scheme with the second embodiment of FIG. 4 subscriber data migration scheme. The network 140 includes, among other non-illustrated nodes, a plurality (two illustrated) of home location registers (HLRs) 142. The home location registers 142 store subscriber data. This subscriber data includes permanently maintained subscriber profile information such as: the subscriber number (SNB), the mobile subscriber number (MSNB), the electronic serial number (ESN) of the subscriber's mobile telephone, subscription service features (like call waiting, call transfer) and associated data, and authentication data. The subscriber data further includes temporarily maintained information like current subscriber location.

The home location registers 142 are interconnected by a common channel signaling (CCS) system 144, such as that commonly provided by the Signaling System No. 7 (SS7) network part of the telecommunications network 140. A data administrator 146 is connected to the home location registers 142. The data administrator 146 functions, at the very least, as a user interface with the network operator. The common channel signaling system 144 serves as a physical layer for transporting subscriber data stored in one node (such as the home location register 142(1)) for communication to and storage in another node (such as the home location register 142(2)) in response to commands issued by the data administrator 146. This transfer functionality is implemented in accordance with the signal flows and nodal operations illustrated in FIG. 3 (described above). The home location registers 142 are also connected to a service management access layer (SMAL) interface 148. This connection among and between the home location registers 142, service management access layer 148, and data administrator 146 is preferably made through a network 150 connection such as that provided through the use of an X.25 network that is separate from the telecommunications network 140. The service management access layer 148 includes data migration logic 152 which is responsive to generic commands received from the data administrator 146 for generating node specific commands for the purpose of extracting subscriber data stored in one node (such as the home location register 142 (1)) for communication to and storage in another node (such as the home location register 142(2)). This transfer functionality is implemented in accordance with the signal flows and nodal operations illustrated in FIG. 5 (described above).

The transfer functionalities may be implemented in a complementary fashion in accordance with the signal flows and nodal operations illustrated in FIGS. 3 and 5 (described above). In instances where congestion concerns arise over the simultaneous use of the common channel signaling system 144 for conventional call control signaling as well as subscriber data migration, use may instead be made of the network 150, under the control of the data migration logic 152 of the service management access layer 148, to perform the migration between the home location registers 142. For example, in instances where the subscriber data of a large number of subscribers needs to migrated (such as in connection with a wholesale back-up of a certain home location register), these communications may adversely affect operation of and throughput over the common channel signaling system 144. Use of the network 150 in this situation may comprise a better and more efficient choice. Furthermore, instances might arise wherein a verification of the common channel signaling system functionality level is not obtain. In this case, transfer using the common channel signaling system is aborted in favor of using the network 150. In other situations, it may be more efficient to utilize the common channel signaling system 144 to perform the migration between the home location registers 142. For example, in instances where minimal amount of subscriber data must be migrated, or in instances where loading on the common channel signaling system 144 is not an issue, these communications may just as easily be supported by the common channel signaling system. Accordingly, the data administrator 146 may further function to evaluate (action 154, see, FIGS. 3 and 5) which of the available transfer functionalities should be implemented taking into account such considerations as network loading, efficiency, size of file transfer, and the like.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A data migration system for a telecommunications network, comprising:

- a first database node for storing telecommunications related data;
- a second database node for storing telecommunications related data;
- a common channel signaling system link of the telecommunications network connecting the first and second database nodes; and
- a data administrator generating a command issued to the first database node to extract certain telecommunications related data and format the extracted data for communication over the common channel signaling system link towards the second database node;

wherein the first database node verifies with the second database node prior to execution for the command a common channel signaling functionality level of the second database node for supporting the data communication.

2. The system as in claim 1 wherein the common channel signaling system comprises a Signaling System No. 7 (SS7) network.

3. The system as in claim 1 wherein the first and second database nodes comprise home location registers (HLRs) within the telecommunications network.

4. A data migration system for a telecommunications network, comprising:

a first database node for storing telecommunications related data;

a second database node for storing telecommunications related data;

a data network connecting the first and second database nodes;

a data administrator generating a generic command to migrate certain telecommunications related data between the first and second database nodes; and an interface connected to the data network, the interface responding to the data administrator issued generic command by generating a first database node specific command to fetch certain telecommunications related data over the data network from the first database node, and further generating a second database node specific command to download the fetched certain telecommunications related data over the data network for storage in the second database node.

5. The system as in claim 4 wherein the data network comprises an X.25 network.

6. The system as in claim 4 wherein the first and second database nodes comprise home location registers (HLRs) within the telecommunications network.

7. A data migration system for a telecommunications network, comprising:

a first database node for storing telecommunications related data;

a second database node for storing telecommunications related data operating to verify a common channel signaling functionality level for the first database node;

a data network connecting the first and second database nodes;

a common channel signaling system link of the telecommunications network connecting the first and second database nodes;

a data administrator operating responsive to an operator request for migration of certain telecommunications related data between the first and second database nodes to:

evaluate transfer considerations and select either the data network or common channel signaling system to carry the migration;

operate responsive to selection of the common channel signaling system and verification of common channel signaling functionality level by generating a command issued to the second database node to extract certain telecommunications related data and format the extracted data for communication over the common channel signaling system link towards the first database node; and operate responsive to the selection of the data network by generating a generic command to migrate certain telecommunications related data between the second and first database nodes; and an interface connected to the data network, the interface responding to the data administrator issued generic command by generating a second database node specific command to fetch certain telecommunications related data over the data network from the second database node, and further generating a first database node specific command to download the fetched certain telecommunications related data over the data network for storage in the first database node.

8. The system as in claim 7 wherein the data network comprises an X.25 network.

9. The system as in claim 7 wherein the common channel signaling system comprises a Signaling System No. 7 (SS7) network.

10. The system as in claim 7 wherein the first and second database nodes comprise home location registers (HLRs) within the telecommunications network.

11. A method for telecommunications related data migration comprising the steps of:

generating a first command issued to a first database node for the migration of certain telecommunications related data;

verifying with a second database node a common channel signaling system functionality level for supporting migration;

extracting of the certain telecommunications related data from the first database node;

formatting the extracted certain telecommunications related data for common channel signaling communication;

sending the formatted communication over a common channel signaling system to the second database node to the execute the migration;

unformatting the formatted communication; and storing of the certain telecommunications related data in the second database node.

12. The method as in claim 11 wherein the common channel signaling system comprises a Signaling System No. 7 (SS7) network.

13. The method as in claim 11 wherein the first and second database nodes comprise home location registers (HLRs) within a telecommunications network.

14. A method for telecommunications related data migration comprising the steps of:

generating a generic command for the migration of certain telecommunications related data;

responding to the generic command by generating a first database node specific command;

fetching the certain telecommunications related data from the first database node over a data network in response to the first database node specific command;

responding to the generic command by generating a second database node specific command; and downloading of the certain telecommunications related data communicated over the data network for storage in the second database node in response to the second database node specific command.

15. The method as in claim 14 wherein the data network comprises an X.25 network.

16. The method as in claim 14 wherein the first and second database nodes comprise home location registers (HLRs) within a telecommunications network.

* * * * *